(12) United States Patent
Arslan et al.

(10) Patent No.: US 11,288,682 B2
(45) Date of Patent: Mar. 29, 2022

(54) ANALYTICS SYSTEM TO ANALYZE AND REPORT CUSTOMER EXPERIENCE

(71) Applicant: SESTEK Ses ve iletişim Bilg. Tekn. San. Ve Tic. A.Ş, Istanbul (TR)

(72) Inventors: Mustafa Levent Arslan, Istanbul (TR); Tülin Ebcioğlu, Istanbul (TR)

(73) Assignee: SESTEK SES VE ILETISIM BILG. TEKN. SAN. VE TIC. A.S., Istanbul (TR)

( * ) Notice: Subject to any disclaimer, the term of this patent is extended or adjusted under 35 U.S.C. 154(b) by 288 days.

(21) Appl. No.: 16/403,551

(22) Filed: May 5, 2019

(65) Prior Publication Data

US 2020/0349583 A1 Nov. 5, 2020

(51) Int. Cl.
*G06Q 30/00* (2012.01)
*H04M 3/493* (2006.01)
*H04M 3/22* (2006.01)
*G06F 9/54* (2006.01)

(52) U.S. Cl.
CPC ........... *G06Q 30/016* (2013.01); *G06F 9/542* (2013.01); *H04M 3/22* (2013.01); *H04M 3/493* (2013.01); *H04M 2203/407* (2013.01); *H04M 2203/555* (2013.01); *H04M 2203/558* (2013.01)

(58) Field of Classification Search
CPC ........ G06F 9/542; G06Q 30/016; H04M 3/22; H04M 3/493; H04M 2203/407; H04M 2203/555; H04M 2203/558
USPC ........................ 379/265.06, 265.07; 705/304
See application file for complete search history.

(56) References Cited

U.S. PATENT DOCUMENTS

| | | | |
|---|---|---|---|
| 10,275,522 B1* | 4/2019 | Hernandez | G06F 16/353 |
| 2015/0281436 A1* | 10/2015 | Kumar | H04M 3/5166 |
| | | | 379/68 |
| 2016/0042359 A1* | 2/2016 | Singh | G06F 40/58 |
| | | | 704/2 |
| 2017/0116177 A1* | 4/2017 | Walia | G06F 40/232 |
| 2019/0037077 A1* | 1/2019 | Konig | H04M 3/5183 |

* cited by examiner

*Primary Examiner* — Harry S Hong
(74) *Attorney, Agent, or Firm* — Bayramoglu Law Offices LLC

(57) ABSTRACT

An analytics system to analyze and report customer experience, comprising a customer interface device, an analysis server which analyzes data from a customer and a machine, and the database which is connected to the customer interface device and to the analysis server wherein the database receives data from the customer interface device, and/or the analysis server. The analytics system analyzes and reports customer experience.

15 Claims, 17 Drawing Sheets

ANALYTICS SYSTEM TO ANALYZE AND REPORT CUSTOMER EXPERIENCE

TECHNICAL FIELD

The present disclosure relates to the technical field of an analytic system to analyze and report customer experience during or after a human-machine interaction.

BACKGROUND

The success of a company is determined by customer satisfaction. Thus, there has been a need for solutions that can improve the customer satisfaction by tracking and analyzing interactions between the customer and a machine in various channels.

A conventional interactive voice response (IVR) fails to provide sufficient options to satisfy the customer because a number of processes are required for complex solutions. Further, due to the requirement of automation and increasing the efficiency of a company, there is a need to improve the conventional interactive voice response (IVR).

Also, a use of platforms for the interaction between the customer and the machine such as the interactive voice response (IVR), a mobile assistant, and a chatbot has gradually become popular. However, these platforms cannot attain the desired customer satisfaction since they do not take into account the customer experience.

In addition, the traditional interactive voice response (IVR) platform only provides a large amount of information for the performance without analysis or application. In the traditional call centers, the quality monitoring and the speech analysis can be performed only after the customer is connected to a live customer representative. As a result, the traditional platforms cannot efficiently provide important information on the experience of the customer during the interaction between a customer and a machine.

The present inventors have conceived an analytics system to analyze and report the customer experience during or after a human-machine interaction.

SUMMARY

The analytics system of the present invention aims to provide an analytics system to analyze and report customer experience during or after a human-machine interaction.

More specifically, in the analytics system of the present invention, information can be automatically collected and analyzed such as the time elapsed to be connected to the live customer representative, a misunderstood menu, an answer, and even resistance by a caller to the use of the system. When this information is used to analyze the customer experience, the function of the human-machine interaction (an interactive voice response (IVR), can be strengthened and the customer satisfaction will increase.

Further, the analytics system of the present invention can monitor and optimize the experience of a customer when the customer interacts with the customer interface through voice, text, key pad, etc. Specifically, the analytics system of the present invention can monitor behaviors of a customer such as the types of selected menus, speech parameters, and others to examine the effect of each prompt. By such collected data, it is possible to identify where the confusion exists, where the bottlenecks are, and critical points of failure in order to improve the customer experience. When a customer has a good experience, that customer will use the system more often and this will encourage the customer to use another self-service function in the system.

The present disclosure provides an analytics system to analyze and report customer experience during or after a human-machine interaction, comprising a voice and text interface device such as interactive voice response (IVR), a chatbot, or a mobile assistant, an analysis server which analyzes data from the call recorder unit, the storage unit and/or the database. The database is connected to the call recording server, to the analysis server and the web server. The database receives data from the call recording server, the webserver and/or the analysis server.

With respect to speech based conversational systems, the present disclosure provides a process to analyze and report customer experience, comprising steps a) sending speech data in a conversation between a customer and a customer interface device to a call recording server, step b) recording the speech data in the call recording server and storing the speech data in a storage unit, and sending details of the call from the storage unit and call recording server to a database, and step c) sending data from the storage unit and the database to an analysis server, performing speech to text conversion and extracting parameters of the conversation and a speech style of the customer in the analysis server, d) the analysis server receives prompt tags from the database, and the analysis server tags the prompt, and e) the authorized user accesses a web server, and receives conversation information, speech data, and analysis results.

Compared to a text based conversational systems, the present invention provides a process to analyze and report customer experience, comprising a) recording the content of the communication between a customer and the system (machine), b) sending data from the database to an analysis server, and extracting parameters about a conversation and a speech style of a customer, c) the analysis server receives prompt tags from the database, and the analysis server tags the prompt based on the data, and d) an authorized user accesses a web server, and receives conversation information, and analysis results.

Other technical advantages of the analytics system provided by the present disclosure are the same as the technical advantages of the analytics system as described above, which will not be described herein.

BRIEF DESCRIPTION OF THE DRAWINGS

In order to more clearly illustrate the embodiments of the present disclosure, a brief description of the drawings is given below. Obviously, the following drawings are only illustrative of some of the embodiments of the present disclosure and for a person of ordinary skill in the art, other drawings may be obtained from these drawings without inventive effort.

FIGS. 10A-10B is data showing a quick search according to one aspect of the present disclosure;

FIGS. 11A-11B is data showing a quick search including a chat view according to one aspect of the present disclosure;

DETAILED DESCRIPTION

Figure 1:
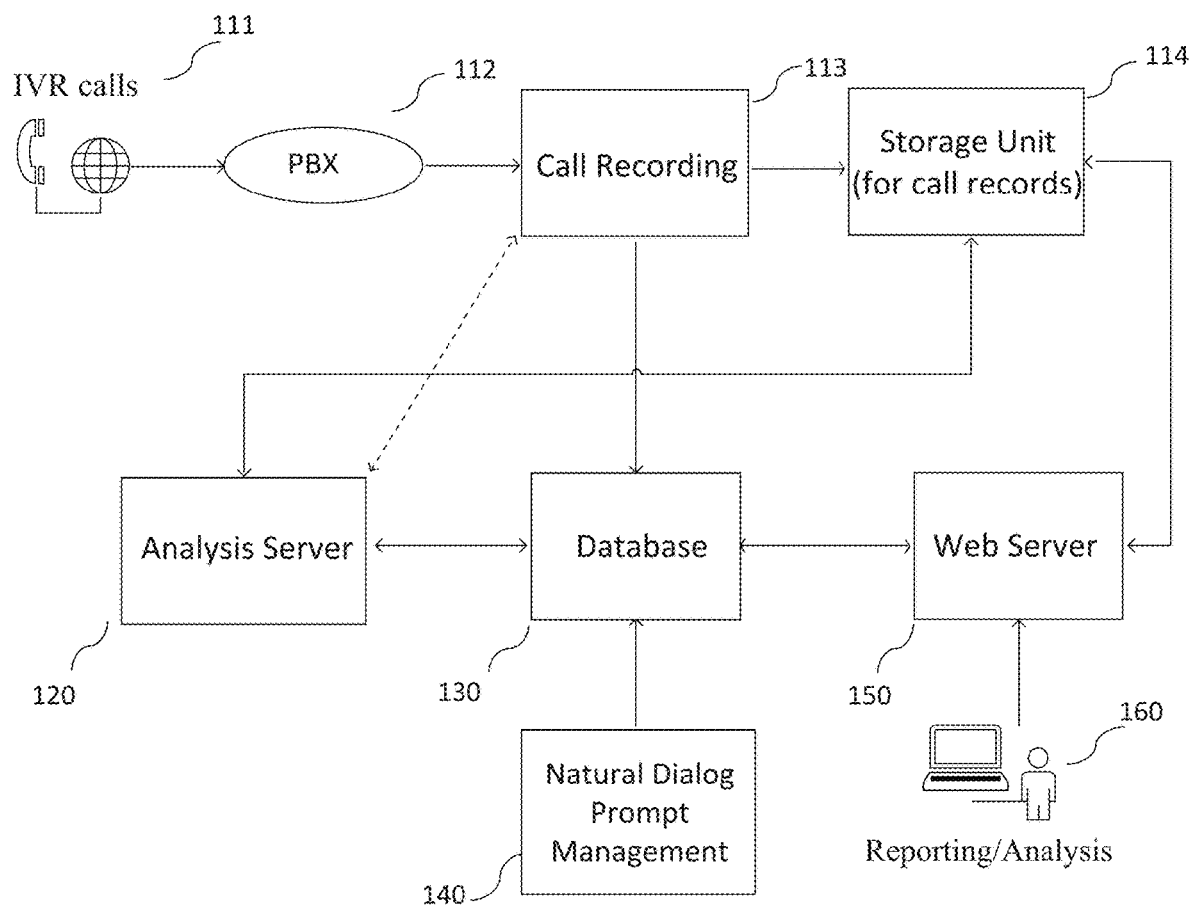
FIG. 1 is a diagram showing an analytics system including an interactive voice response (IVR) call device.
Figure 2:
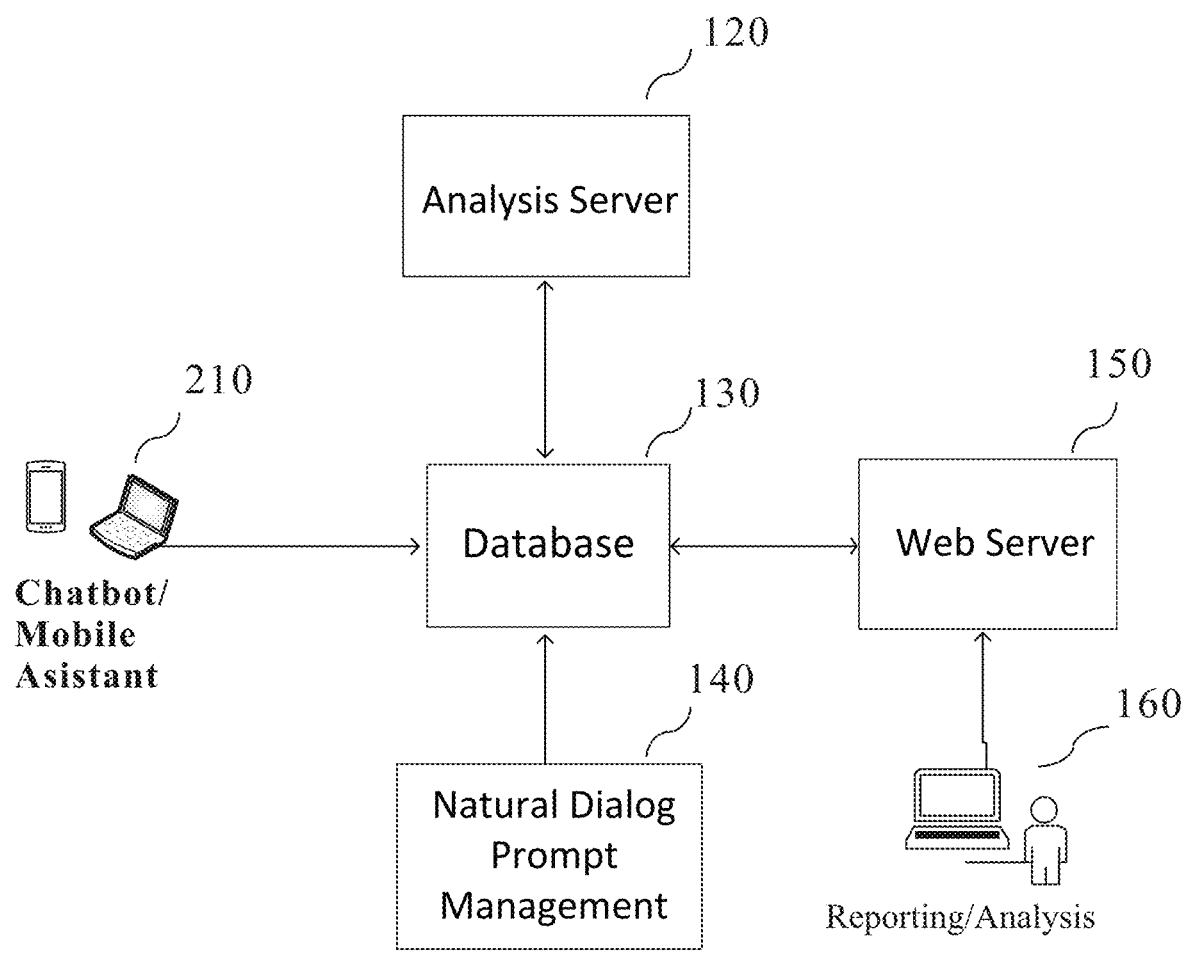
FIG. 2 is a diagram showing an analytics system including a chatbot or a mobile assistant.

The technical solutions of the present disclosure will be clearly and completely described below with reference to the drawings. Obviously, the embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

The present invention provides an analytics system to analyze and report customer experience during or after a human-machine interaction, comprising the IVR calls unit 111, the PBX 112, the call recording server 113, the storage unit 114, the analysis server 120 which analyzes data from the call recording server 113, the storage unit 114, and the database 130. The database 130 is connected to the call recording server 113, to the analysis server 120, the natural dialog prompt management unit 140 and the web server 150. The database 130 receives data from the call recording server 113, from the analysis server 120, the natural dialog prompt management unit 140 and the web server 150.

Customer Interface Device

The customer interface device serves to provide an interface function to acquire and store the information obtained from the customer and the machine as a result of human-machine interface when customer responds to machine prompts.

The customer interface device may include but not limited to the interactive voice response (IVR) call device 111, the chatbot 210, or mobile assistant 210 or any equivalent device.

The interactive voice response (IVR) 111 usually means an automated telephony system that interacts with the callers, gathers information and routes calls to the appropriate recipients. This interactive voice response (IVR) call device 111 is connected to the private branch exchange (PBX) unit 112. The PBX unit 112 is connected to the call recording server 113. The call recording server 113 is connected to the storage unit 114. The private branch exchange 112 provides a telephone system within the company that switches calls between the company customers on local lines while allowing all the customers to share a certain number of external phone lines. The call recording server 113 of the present invention records the customer-IVR interaction. Further, the storage unit 114 provides a space to store the call recorded in the call recording server 113.

The chatbot 210 of the present invention includes but not limited to a smartbot, talkbot, chatterbot, Bot, IM bot, interactive agent, Conversational interface or Artificial Conversational Entity. The chatbot provides a computer program or an artificial intelligence which conducts a conversation via auditory or textual methods.

The mobile assistant 210 of the present disclosure provides professional administrative, technical, or creative (social) assistance as a virtual assistant to clients remotely.

In one aspect of the present invention, all the interactions can be displayed as a text both for a customer and a customer interface device and they can be viewed in the customer interface device and on the customer side via an interface. The voice recording can be played back via the interface. While listening to the voice recording, the interview can be divided into different sections, and depending on the results of the analysis and on the various situations in a given call, the different sections of an interview can be easily differentiated by showing different colors. For example, the prompt of "Welcome to Sestek. How can I help?" can be tagged as "welcome" and can be shown in a different color. The authorized user of the system can select the tags which the authorized user wants to see on a call image (for example, a waveform). These tags are selected from a list to be presented to the authorized user during the interview.

In one aspect of the present invention, the text of the system's prompt can be stored in a web server. An authorized user can edit a new prompt text on a screen. This new prompt text can be automatically added to the language model used for analysis to increase speech recognition accuracy.

In one aspect of the present invention, speech to text conversion is performed on the recorded speech that takes place during human-machine interface between the caller and the customer interface. The analytics system compares and analyzes the text with the prompt played by the system to map the call thereby.

In one aspect of the present invention, a web interface can show the prompts such as Welcome, Exact match, Multi-match, No matches, Silence, Error, Understandability (Low confidence score), Disapprove, etc. The system can compare these prompts with the analyzed results of the customer including greeting, silence, exact match, multiple match, error, etc.

In one aspect of the present invention, it is necessary to rearrange the prompt based on a given scenario chart presented as a branch diagram. When the prompt is added, removed or changed in a scenario chart, a newly updated version of the scenario chart can be used. The web server 150 is connected to the database 130 and the storage unit 114 and can transmit and receive data from the database 130 and the storage unit 114. This data can be the details of prompt text, prompt number in a scenario chart, prompt tag, prompt type, a menu name, a menu code of the prompt, and others.

Analysis Server

The analysis server 120 of the present invention is connected to the database 130 and the storage unit 114. The analysis server 120 analyzes the data received from the storage unit 120 and/or the database 130. The customer's data is obtained from the call recording server 113 or the storage unit 114. The call recording server 113 is connected to the PBX 112. The call recording server 113 receives data from the PBX 112. The analysis server 120 receives data from the call recording server 113 and/or from the storage unit 114 and the database 130.

The analysis server 120 analyzes—response time of the system to the customer's speech. The time for the customer response is also measured. The analysis is conducted based on the prompt tag. For example, after a prompt, it may take a customer a certain time to react to the prompt. Furthermore, it may take a customer even longer time to respond to a subsequent prompt. These response times are measured in the analysis server 120.

The analysis server 120 analyzes the occasion where a customer wishes to talk to a live customer representative and therefore when a customer wishes to be transferred to a live customer representative. The analysis server 120 determines that a customer requests a transfer to a live customer representative. A customer may want to exit the system at a specific point and the customer may want to be connected to a live customer representative at that specific point. When this happens, the analysis server 120 can analyze this event, where a customer wanted to exit the system and to be connected to a live customer representative, and use this information to amend the prompt for clarification. Further, the analysis server 120 identifies any necessary and missing branch in the given scenario. As a result of the analysis server 120 analysis and amendment of the system architecture and branches, a system is modified such that it is less likely that a customer will request to exit the system and to connect to a live customer representative. This increases the system efficiency so that the time for a call is reduced and the number of connection requests to a live customer representative is reduced. Furthermore, as the time that a customer on the system is reduced, the system can be utilized by more customers. Another way, for the same system, more customers can use the system as a result of implementation of the invention. This improves the efficiency of the system.

The analysis server 120 analyzes a point where the customer ends the process. If a customer ends a call at a point where a customer response is required, but a customer choses to end the call, the situation is recorded in the call recording server 113 for reporting. In this way, it is possible to control, check and capture the stage where the customer wants to exit the system, and this information is used to analyze and understand the reason why a customer wants to exit the system. In addition, the analysis can reveal the daily, the weekly or the monthly changes of the number of calls that are ended by the customers at different states of the call.

The analysis server 120 analyzes the percentage of prompts that were listened to by the customers. According to the result, the prompts can be improved such that the prompts are acceptable to the customers so that the percentage of prompts that are listened to by the customers is increased. For example, these types of prompts can be shortened and become clearer.

The analysis server 120 further detects the age and the gender for a customer. The age group of the customer is automatically detected from a voice of the customer and can be used in the analysis. The analysis server 120 can analyze the responses of the customers depending on the age group. For example, the customers in the age group of 18-30 years old may respond more rapidly than those are in the age group of 60 years old. A different prompt can be prepared for the age group of 60 years old. This would provide a better guidance to the age group of 60 years old. In a further aspect of the present invention, the gender of the customer is automatically determined from the voice of the customer and may be used as information for the analysis.

In one aspect of the present invention, information for a dial or speech including the IVR call device 110 is not to be reported when heightened security is required. Further, information for a dial or speech in the IVR call device 110 can be masked such that the information cannot be accessed by an unauthorized person. For example, the customer information should be masked when the customer enters into the stage where the customer's credit card information is required so that a payment with a credit card can be made through the IVR call device 110. In one aspect of the present invention, the data from a customer is protected for security. The data from a customer can include the data from the IVR call device 110, the chatbot or the mobile assistant 210. The data for security can be card information, invoice, or other payment information.

The analysis server 120 calculates the confidence level of the speech recognition of the system. Usually, the speech recognition means the ability of a machine or program to identify words and phrases in a spoken language and convert them to a machine-readable format. The confidence level of a speech recognition is calculated for each command of the customer and shown as a number between 0 and 100. This numerical value indicates how close the recognized text is to an assigned language model. The proximity to 100 indicates that the recognized text is very close to the model and the recognition result is very confident. On the other hand, the proximity to 0 shows that the result is not confident. By using the confidence of the speech recognition, the positive and negative effects of each prompt can be observed. The main idea is that if a confidence level of customer's speech is usually low when a specific prompt is listened to the users, it may be better to review these types of prompts. For example, confidence levels of customer's comments are low if, after welcoming prompt, the customers may be talk while this prompt is listened to the customers.

The silent parts in an interview are automatically detected and shown in a waveform. For example, there may be 3 silences in a conversation that can be shown in a purple color. A second silence may last for 3 seconds after a customer finishes his/her command/utterance (i.e., the speech ends at the 16 second mark from the beginning of the speech, and the silence lasts for another 3 seconds to the 19 second mark). VAD (voice activity detection) is a technique used in speech processing in which the presence or absence of human speech is detected. It may be useful to check the VAD (voice activity detection) settings because of the fact that the prompt is possibly late. The optimization of the VAD settings help clear the speech starting and ending points in a speech recognition process.

In one aspect of the present invention, the analysis server 120 uses a voice biometric authentication system. The voice biometric system can be used to verify a customer's claimed identity or to identify a particular customer. It is often used where the voice is the only available biometric identifier, such as over the telephone. The system can observe whether the voice verification is successful or not, and make a tag to the prompt on the result of verification.

In one aspect of the present invention, the analysis server 120 uses a speech analytics solution. The system provided in the present invention can be integrated with Speech Analytics solutions. The speech analytics is a process of analyzing recorded calls to gather customer and live agent information to evaluate and improve communication and future interaction. The process is primarily used by customer contact centers to extract information buried in client interactions within an enterprise. Thus, it is possible to extract the customer information by this solution such as a customer's mood, the conversation overlap between a customer and a customer interface device, and the speech speed of a customer.

In addition, if a session ID in a conversation with a live customer representative is the same as a conversation in the IVR call device 110, these two calls can be labeled as related calls, and the call to the live customer representative can be accessed—while listening to the IVR call device 111 and vice versa. In one aspect of the present invention, a call to a customer representative can be achieved via the IVR call device 111. A customer call through the IVR call device 111 and a conversation with a live customer representative are connected to each other. Thus, the customer experience analysis is carried out from the beginning to the end. For example, each period of the IVR call device 111 and a live customer representative can be analyzed, or the transaction that a customer connects to a live customer representative through the IVR call device 111 can be analyzed.

In one aspect of the present invention, a customer can be connected to a live customer representative by using a special query through the IVR call device 111. For example, when a customer reports that a card of that particular customer has been stolen, the IVR call is connected to a live customer representative. Thus, it is possible to obtain information about an interaction that starts with a human-machine interface and ends with a live customer representative.

In one aspect of the present invention, a report resulting from a survey that is conducted at the end of a conversation, is added to the corresponding call record.

In one aspect of the present invention, a keystroke of a customer (DTMF: Dual-Tone Multi-Frequency signaling) is indexed to be recorded and inserted into the analysis server 120.

In one aspect of the present invention, an authorized user of the system (supervisor, director, team leader, etc.) can determine a threshold for the analysis values specified in the reports. Statistics can be displayed and monitored to observe if the analysis values are above or below the specified threshold targets. The display can be either as a dashboard or as a pop-up window.

In one aspect of the present invention, the effect of a change to a scenario menu on various control groups can be analyzed. For example, two different scenarios with different prompts for the same subject can be designed, and one can be used for group A and the other can be used for group B. Then, a customer interaction can be analyzed on the system. Thus, as a result of this approach, it is possible to determine which prompt improves the customer's experience.

In one aspect of the present invention, the system can also perform analysis in real time while a call is still in progress. According to the results of the analysis, the system can generate an instant notification and/or referral to a live customer representative or an authorized user. Further, the system provides information as to what the next best action is, legal compliance guidance and other useful information. For example, if a customer gets stuck at a step in the self-service, it will be detected in real time and the necessary information can be given to a live customer representative or the supervisor so that a live customer representative or a supervisor will have the knowledge where the customer got stuck in the analytics system.

Figure 5:
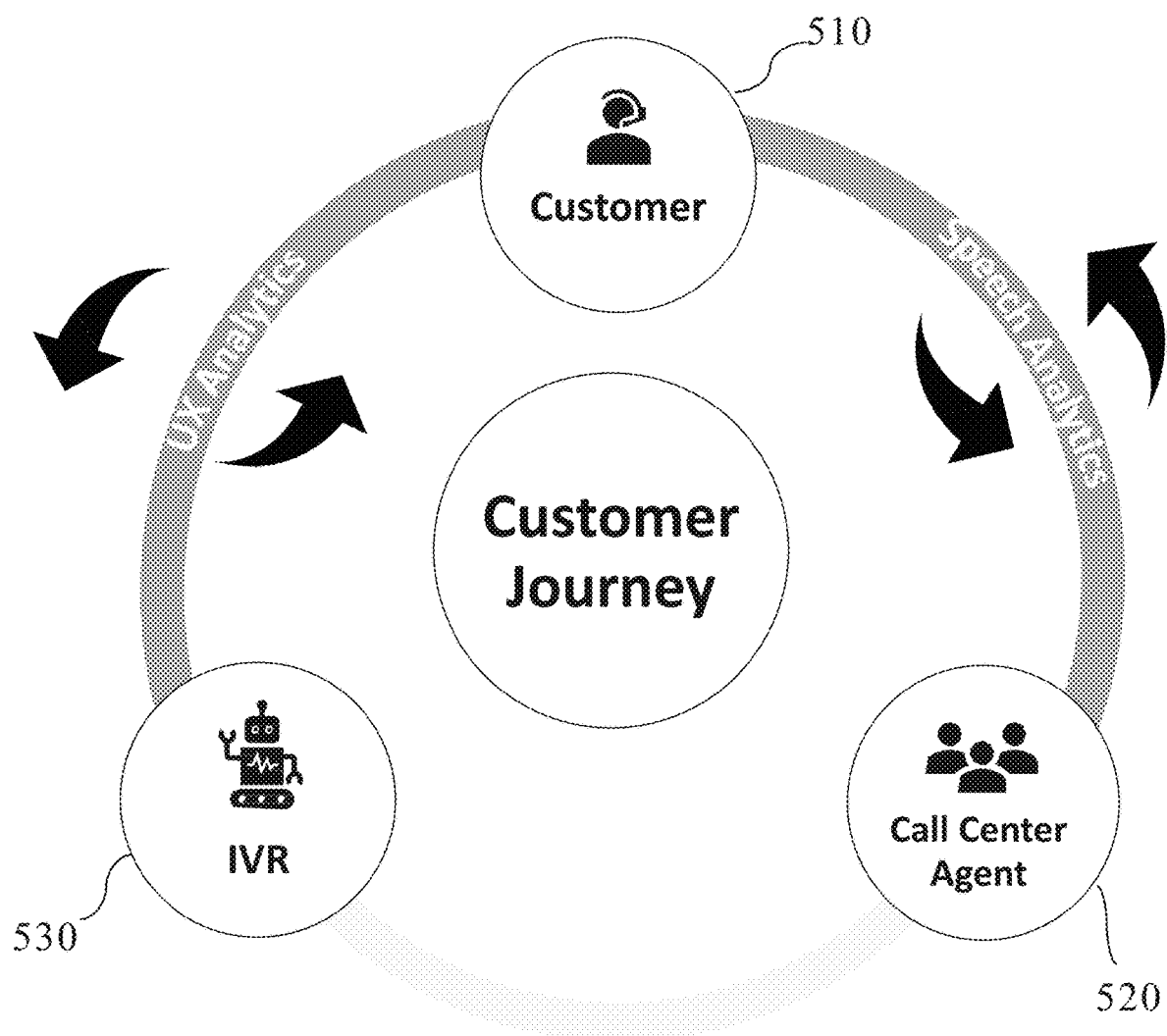
FIG. 5 is a diagram showing customer journey including a customer, an IVR and a call center agent.

In one aspect of the present invention, as seen in FIG. 5, the speech analytics is used between the customer 510 and the call center agent 520. The customer experience analytics is used between the customer and the IVR 530.

Database

In one aspect of the present invention, the database 130 receives data from the call recording server 113, and the analysis server 120. The data received from the call recording server 113, and the analysis server 120 is stored in the database 130. The database 130 can send the stored data in the database 130 to the analysis server 120 and the web server 150. Therefore, the connection between the database 130 and the web server 150 is bidirectional, meaning, the data can move from the web server 150 to the database 130 and from the database 130 to the web server 150. The connection between the database 130 and the analysis server 120 is bidirectional, meaning, the data can move from the analysis server 120 to the database 130 and from the database 130 to the analysis server 120. The database 130 can receive the data from the natural dialog prompt management 140 as explained below.

Natural Dialog Prompt Management Device

In one aspect of the present invention, the analytics system further comprises the natural dialog prompt management device 140. The Natural Dialog Prompt Management device 140 has prompts and their tags, sends them to the database. For example, the welcoming prompt of a system can be "hello, how may help you" and the tag of it can be Welcome. The prompt management device 140 sends all these information to the database, and the analysis server receives this information from the database, and find prompts which are listened to the customer, and then tag these parts with the related tags. It makes easy to search a specific call or a specific prompt in the system. It is not needed to write the whole prompt to find it, it is enough to write tag to search bar.

Web Server

In one aspect of the present invention, the system further comprises the web server 150 through which an authorized user receives the reporting/analysis 160 such as call information, speech data, and an analysis result. An authorized user can access the web server 150 and receive the call information, the speech data, and the analysis result. The web server 150 receives data from the database 130 to display reports and analysis results. The web server 150 also receives recording from the storage unit 114 to play the stored call recording.

Process to Analyze and Report Customer Experience

Figure 3:
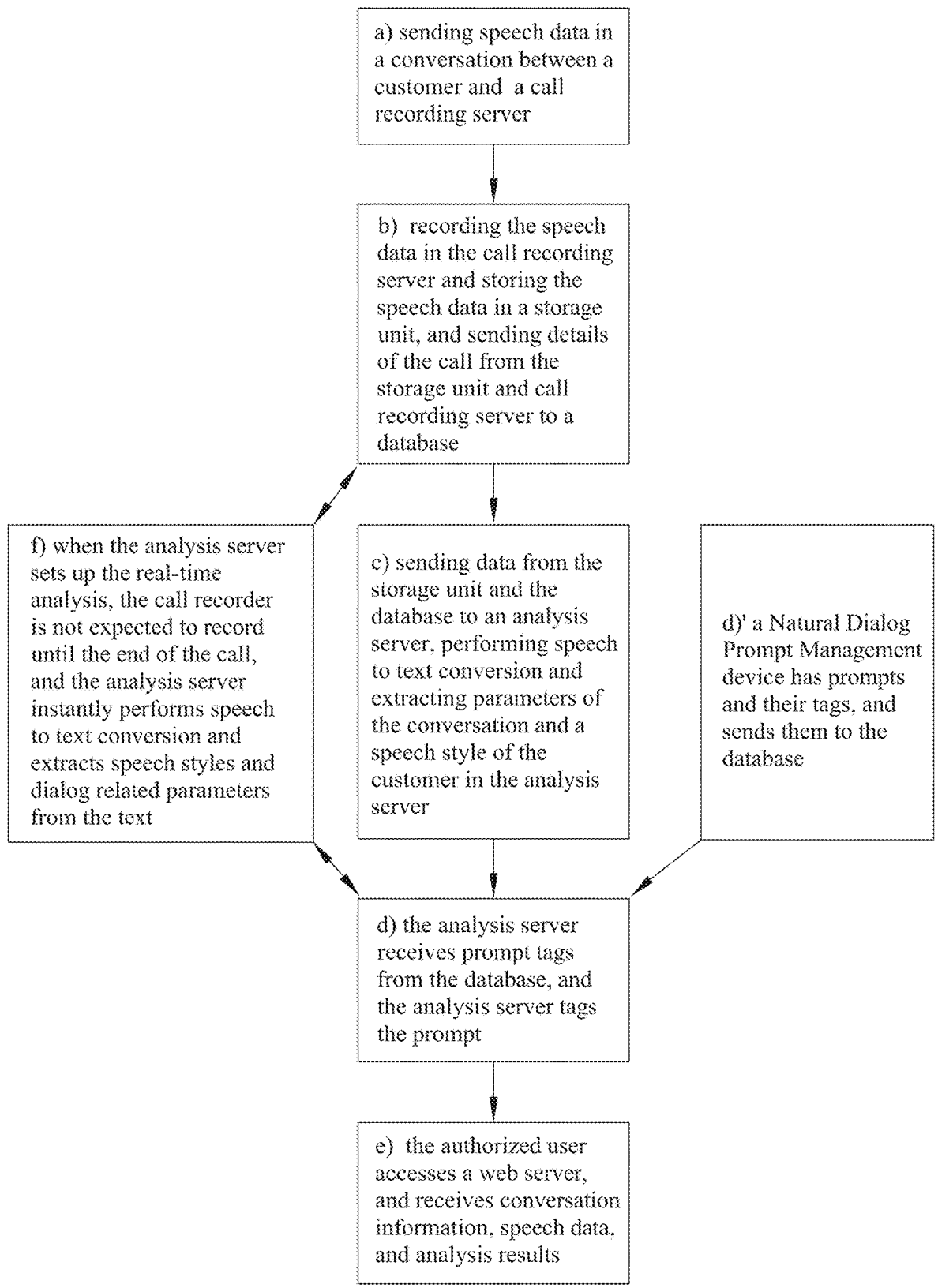
FIG. 3 is a flow chart of a process to analyze and report customer experience including an interactive voice response (IVR) call device.

FIG. 3 shows the process to analyze and report customer experience, comprising a) a step of sending speech data in a conversation between a customer and the call recording server 113, b) a step of recording the speech data in the call recording server 113 and storing the speech data in the storage unit 114 and sending details of the call from the call recording server 113 to the database 130, and c) a step of sending data from the storage unit 114 and the database 130 to the analysis server 120, performing speech to text conversion and extracting parameters of the conversation and the speech style of a customer in the analysis server 120.

In one aspect of the present invention, the process further comprises step d) wherein the analysis server 120 receives tag of a prompt from the database 130, and tags the prompt with related tag.

In one aspect of the present invention, the process further comprises step e) wherein the authorized user accesses the web server 150, and receives the call information, the speech data, and the analysis results.

In one aspect of the present invention, the process further comprises step f) wherein, when the analysis server 120 sets up the real-time analysis, the call recorder is not expected to record until the end of the call, and the analysis server 120 instantly performs speech to text conversion and extracts speech styles and dialog related parameters from the text. The data produced in step f) can be sent to step b) or step d) as shown in FIG. 3.

In one aspect of the present invention, the process further comprises step d)' wherein the Natural Dialog Prompt Management device 140 has prompts and their tags, sends them to the database before step d) is performed. For example, the welcoming prompt of a system can be "hello, how may help you" and the tag of it can be Welcome. The prompt management device 140 sends all these information to the database, and the analysis server receives this information from the database, and find prompts which are listened to the customer, and then tag these parts with the related tags. It makes easy to search a specific call or a specific prompt in the system. It is not needed to write the whole prompt to find it, it is enough to write tag to search bar.

Figure 4:
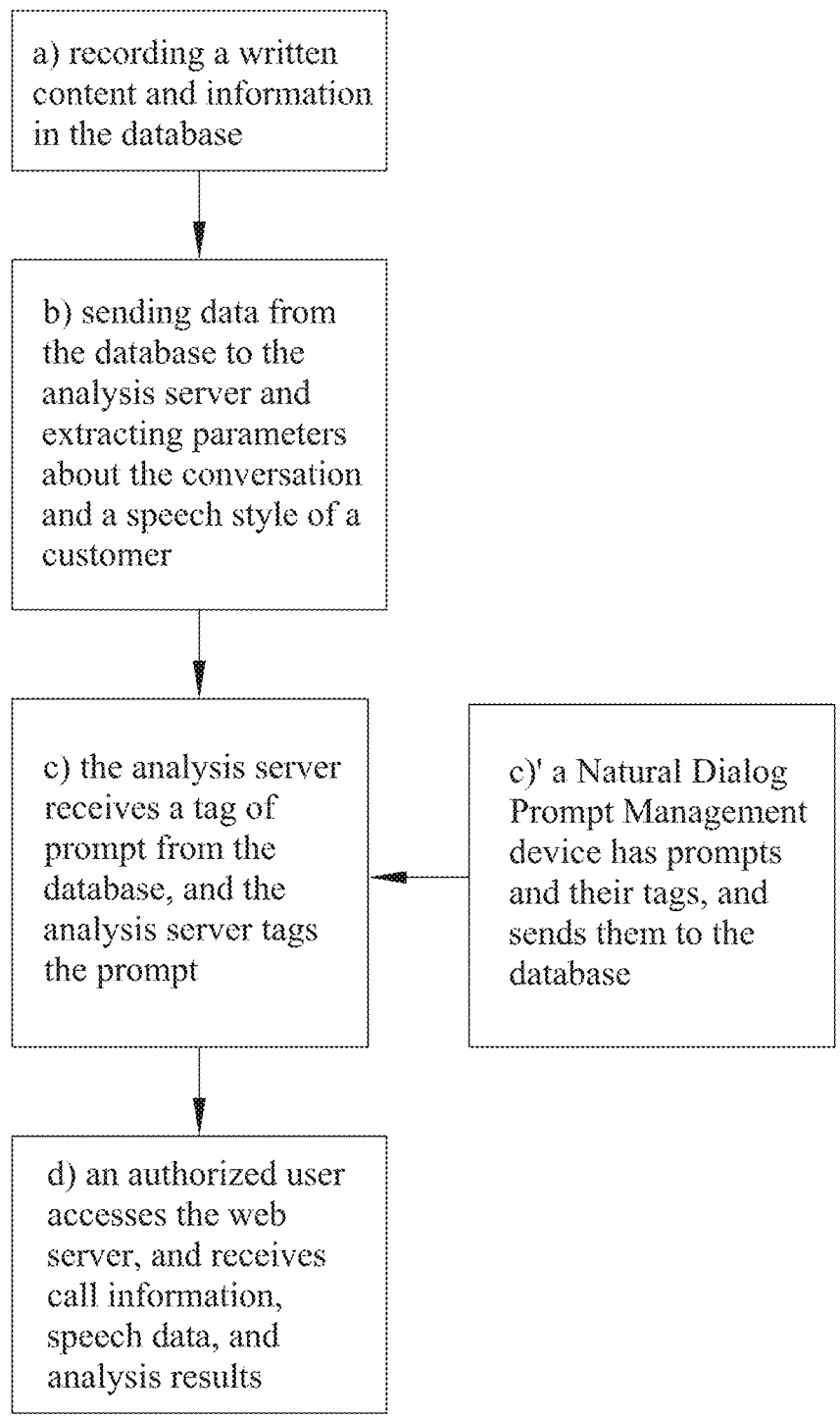
FIG. 4 is a flow chart of a process to analyze and report customer experience including a chatbot or a mobile assistant.

FIG. 4 shows the process to analyze and report customer experience. The process comprising a) recording a written content and information in the database 130, b) sending data from the database 130 to the analysis server 120 and extracting parameters about the conversation and a speech style of a customer, c) the analysis server 120 receives a tag of prompt from the database 130, and the analysis server 120 tags the prompt, and d) an authorized user accesses the web server 150, and receives call information, speech data, and analysis results.

In one aspect of the present invention, the process further comprises the step c)' wherein the Natural Dialog Prompt Management device 140 has prompts and their tags, sends them to the database 130 before step c) is performed.

Figure 6:
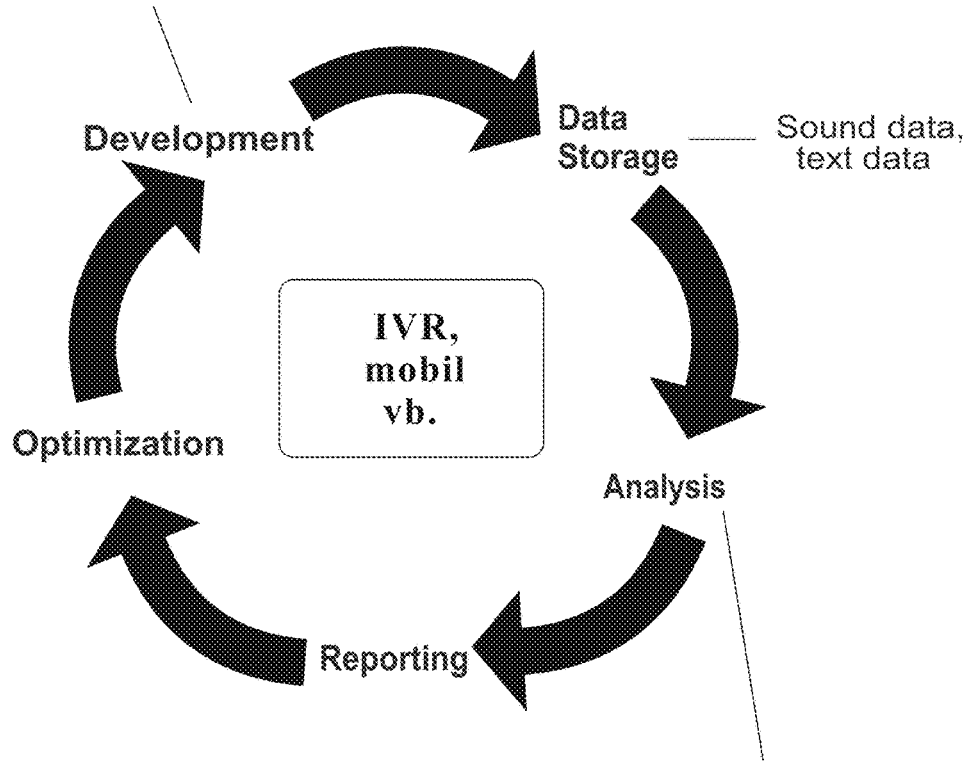
FIG. 6 is a diagram showing an example to analyze and report customer experience, including a data storage, an analysis, reporting, an optimization, and a development.
Figure 7A:
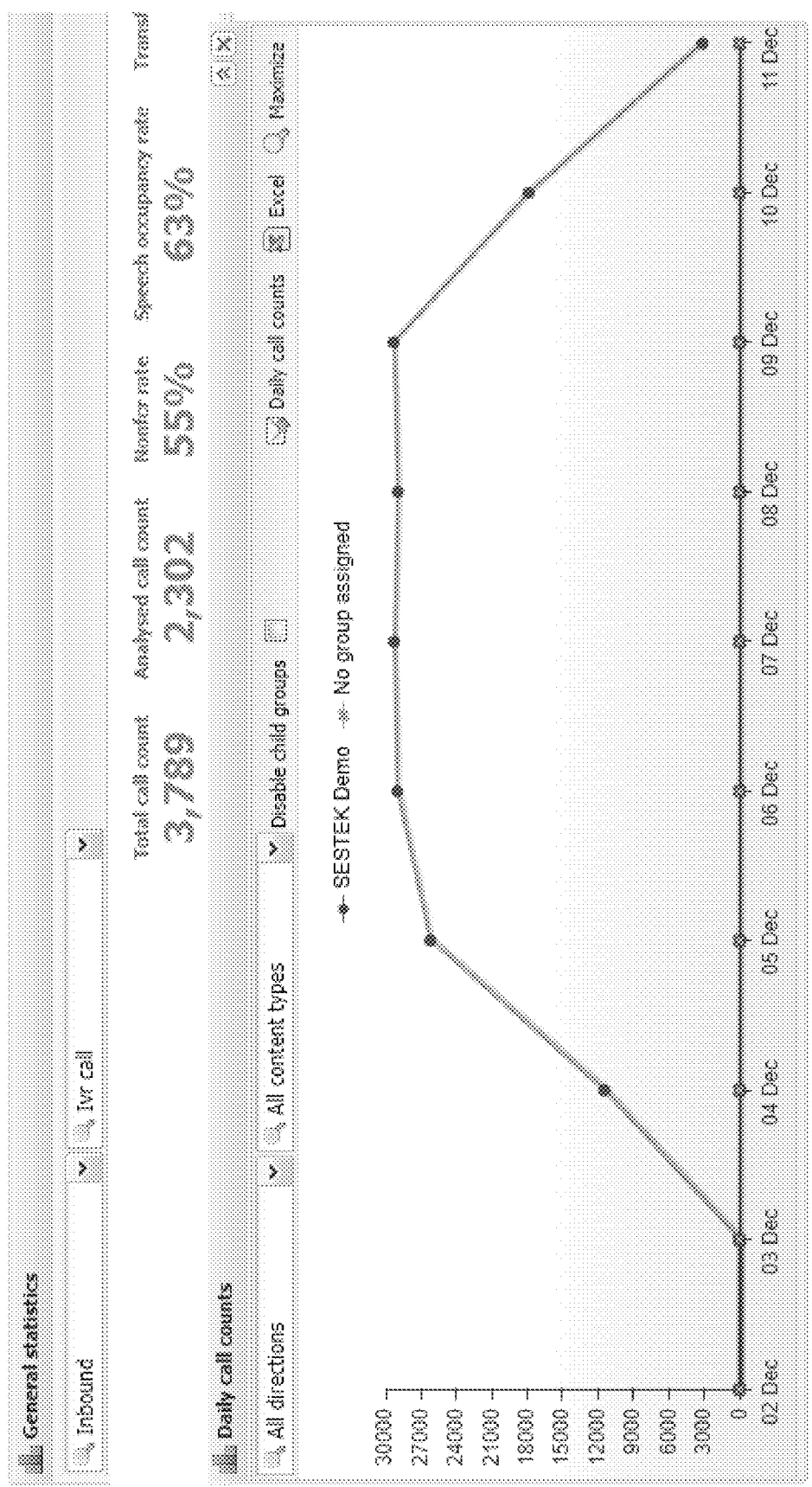
FIGS. 7A-7D is a graph showing general statistics according to one aspect of the present disclosure.
Figure 7B:
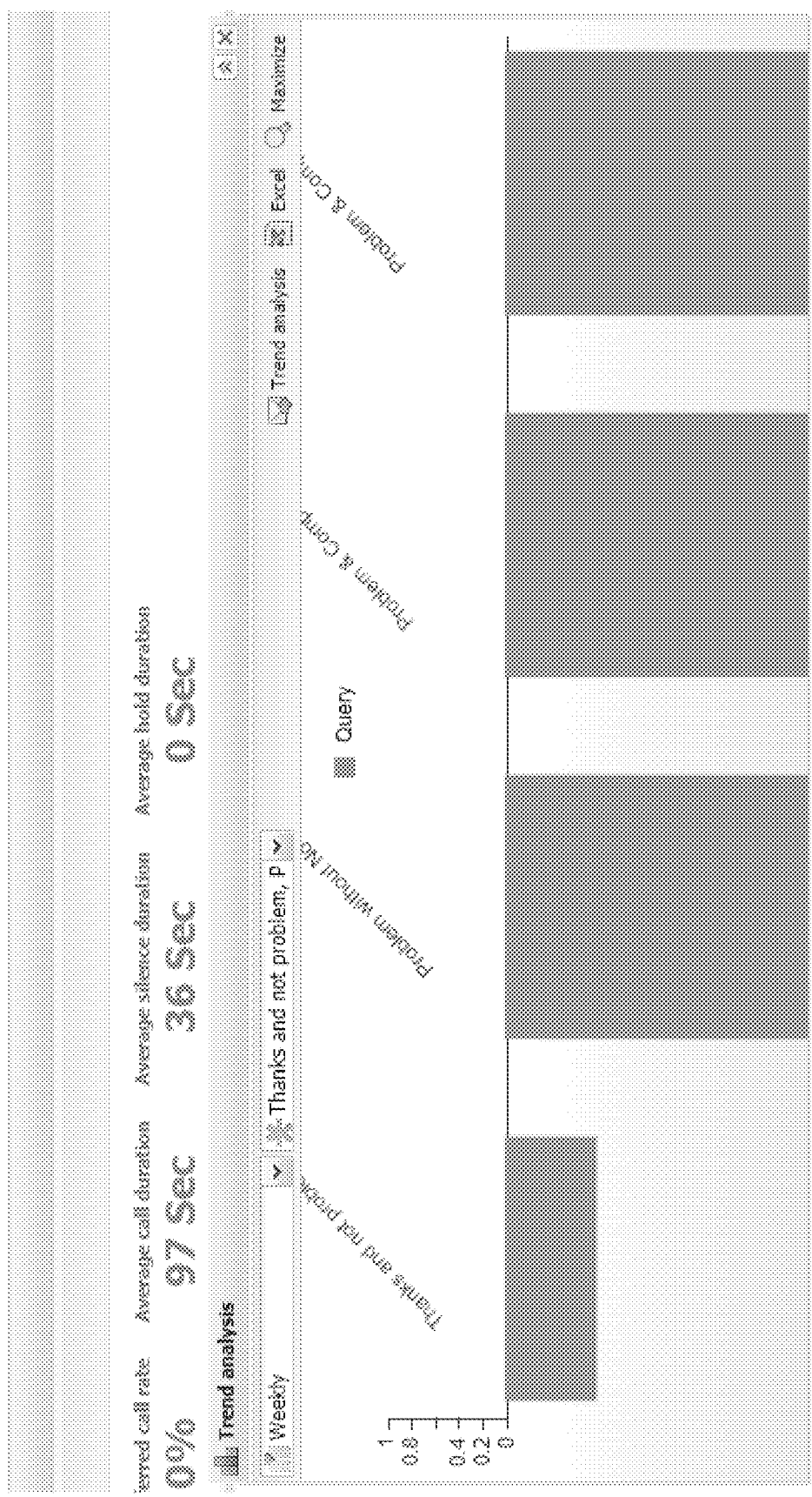
Figure 7C:
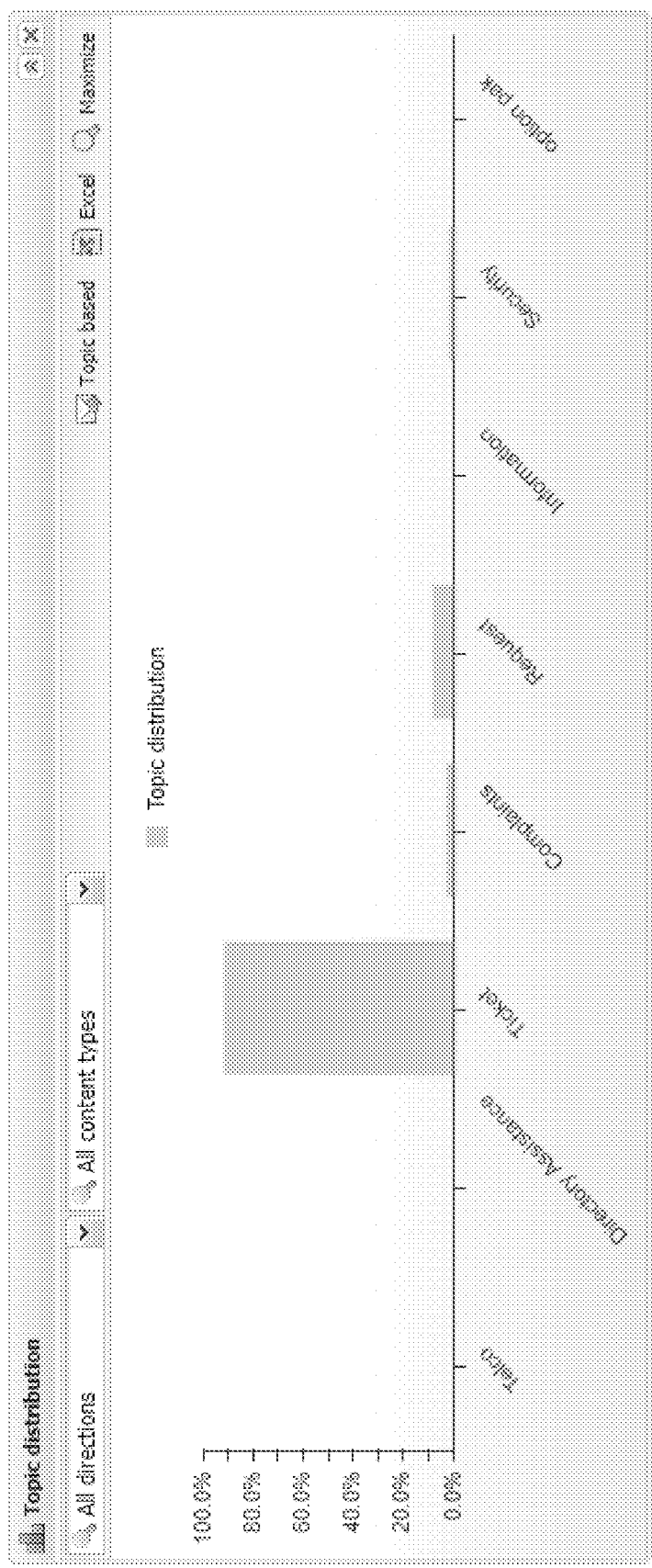
Figure 7D:
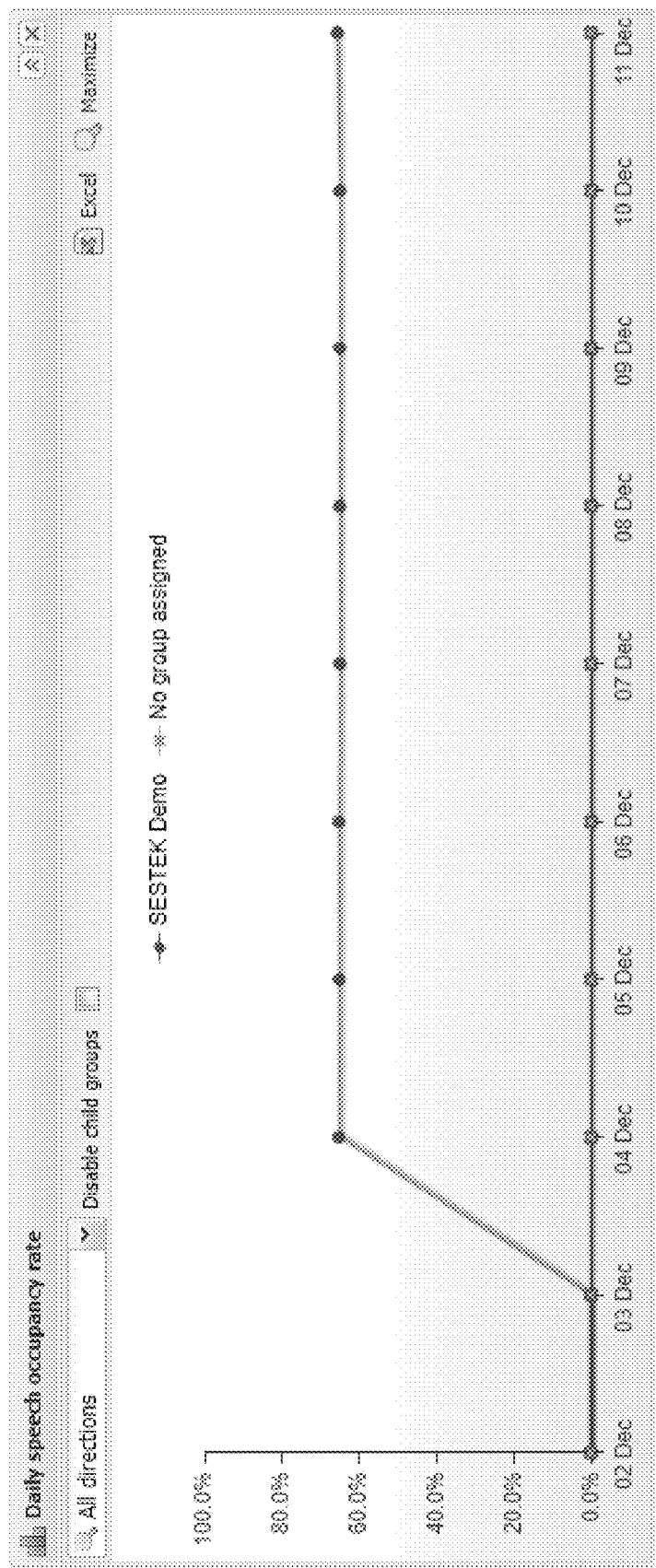

FIG. 6 shows the flow of the system. The speech and text data from the IVR call device 111, the chatbot, or the mobile assistant 210 are stored in the data storage unit 114. The data is analyzed in the analysis server 120, wherein the analysis includes the reaction time, the emotion analysis, the demographic analysis, use of the voice verification/biometrics, the comparison of prompt tag with customer reactions, and other characteristics of a customer's interaction with the system. The result of the analysis is reported to the database 130, and to an authorized user via the web server 150. The system is optimized by using the analysis data to change the prompt, change the scenario, change the setting of the voice activity detection (VAD), change of the barge-in setting, speech recognition, and use of voice verification. The system is further optimized by applying a special prompt and a special menu based on each customer group.

Finally, it should be noted that the above embodiments are only used to illustrate the technical aspects of the present disclosure, rather than limiting the invention by presenting the embodiments in this disclosure. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

EXAMPLE

Example 1

FIGS. 7A-7D provides a summary report for incoming calls over a certain date range. Reports show the number of calls and average call time. In addition, the calls within this range will be analyzed about what words or phrases are most often used by a robot or a customer. Numerical changes of the calls to be followed can be observed monthly, weekly and daily (e.g., the calls for more than 10 seconds of silence, the calls such as a mistake in prompts). If the calls are voice calls (such as the IVR call device 110, or mobile assistant 210), the number of conversations is reported as a percentage with the distribution of the call numbers on a daily basis.

Example 2

Figure 8:
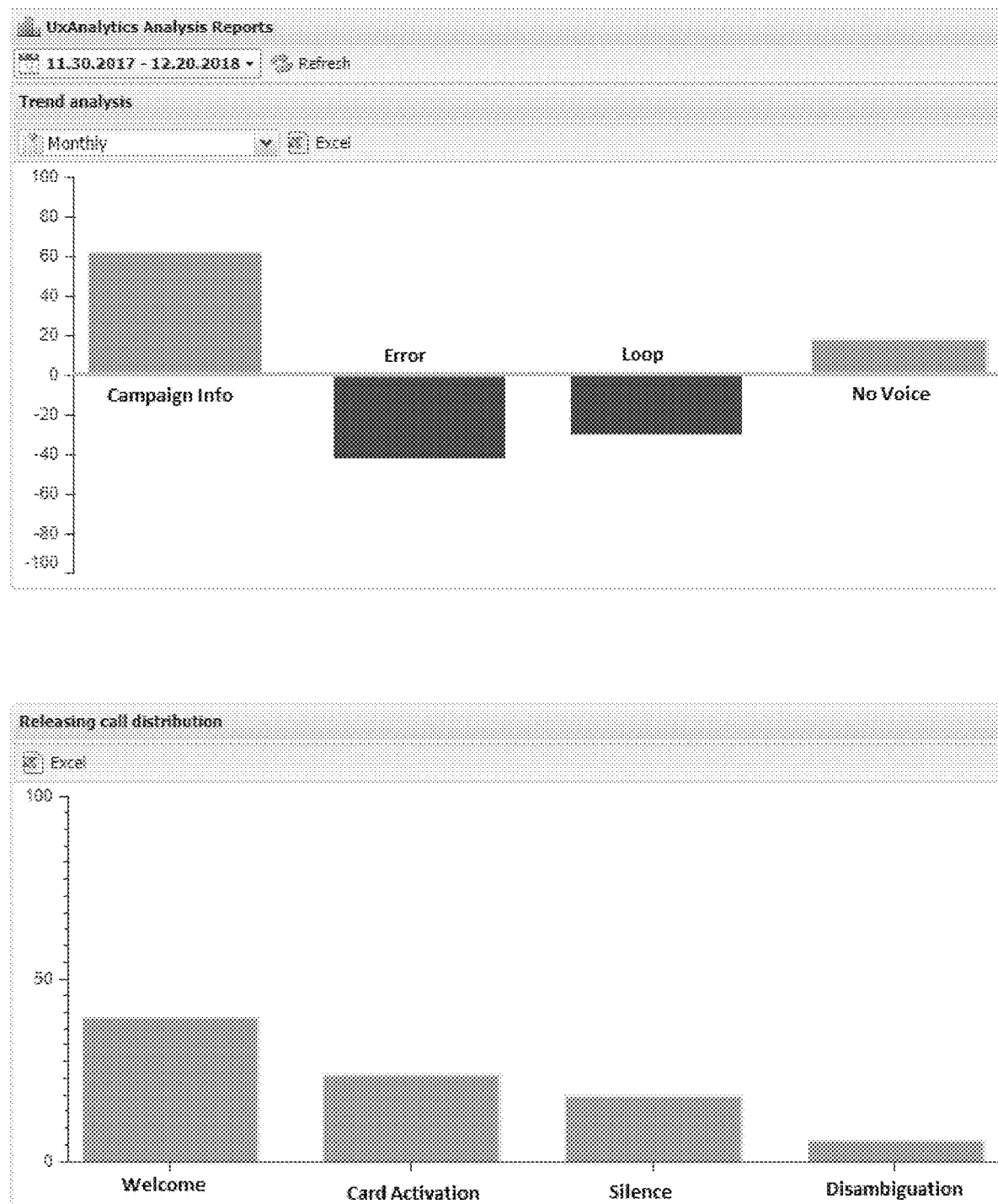
FIG. 8 is a graph showing customer experience analysis reports according to one aspect of the present disclosure.

FIG. 8 shows the customer experience analysis reports showing where (at which prompt) customers leave the conversation; and its trend analysis. Each call is issued with the latest prompt tag and reported in a percentage for what calls are ended in general. For example, up to 50% of the calls within the time range selected in the Call Closure Breakdown report were ended after the Auto Contact prompt. If this is a scenario where the calls are not expected to end at this point, one can review these calls and find where the problems exist. In addition, in the Trend Analysis report, monthly, weekly and daily changes of the Call Closure Distribution report are also easily monitored.

Example 3

Figure 9:
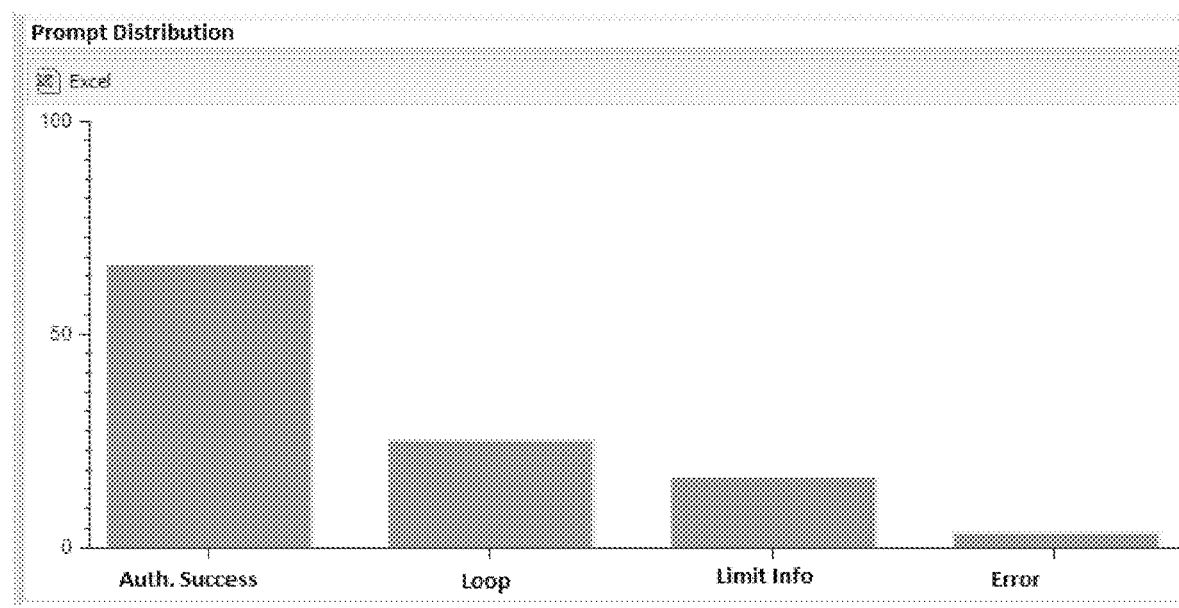
FIG. 9 is a graph showing prompt distribution according to one aspect of the present disclosure.

FIG. 9 shows the prompt distribution, and shows where (at which prompt) customers leave the conversation; and its trend analysis. The report is taken on what prompts are given in most calls in the selected time range. All the last tags in each call are extracted and collected, and then analyzed to find out what is more frequently used. If there are more unexpected prompts (e.g., the error prompts), it is possible to go to the related calls to see in what step an unexpected prompt has occurred.

Example 4

Figure 10A:
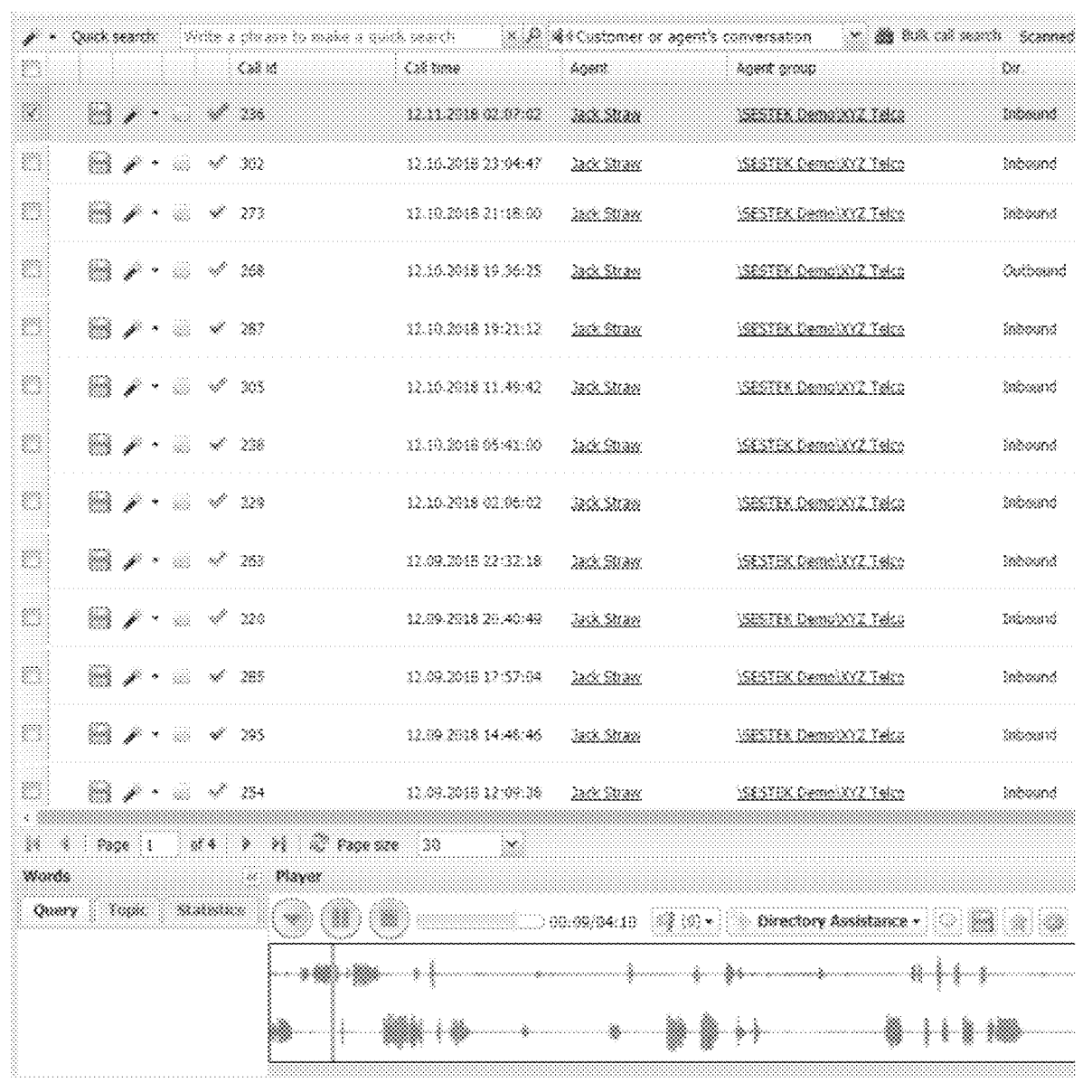
Figure 10B:
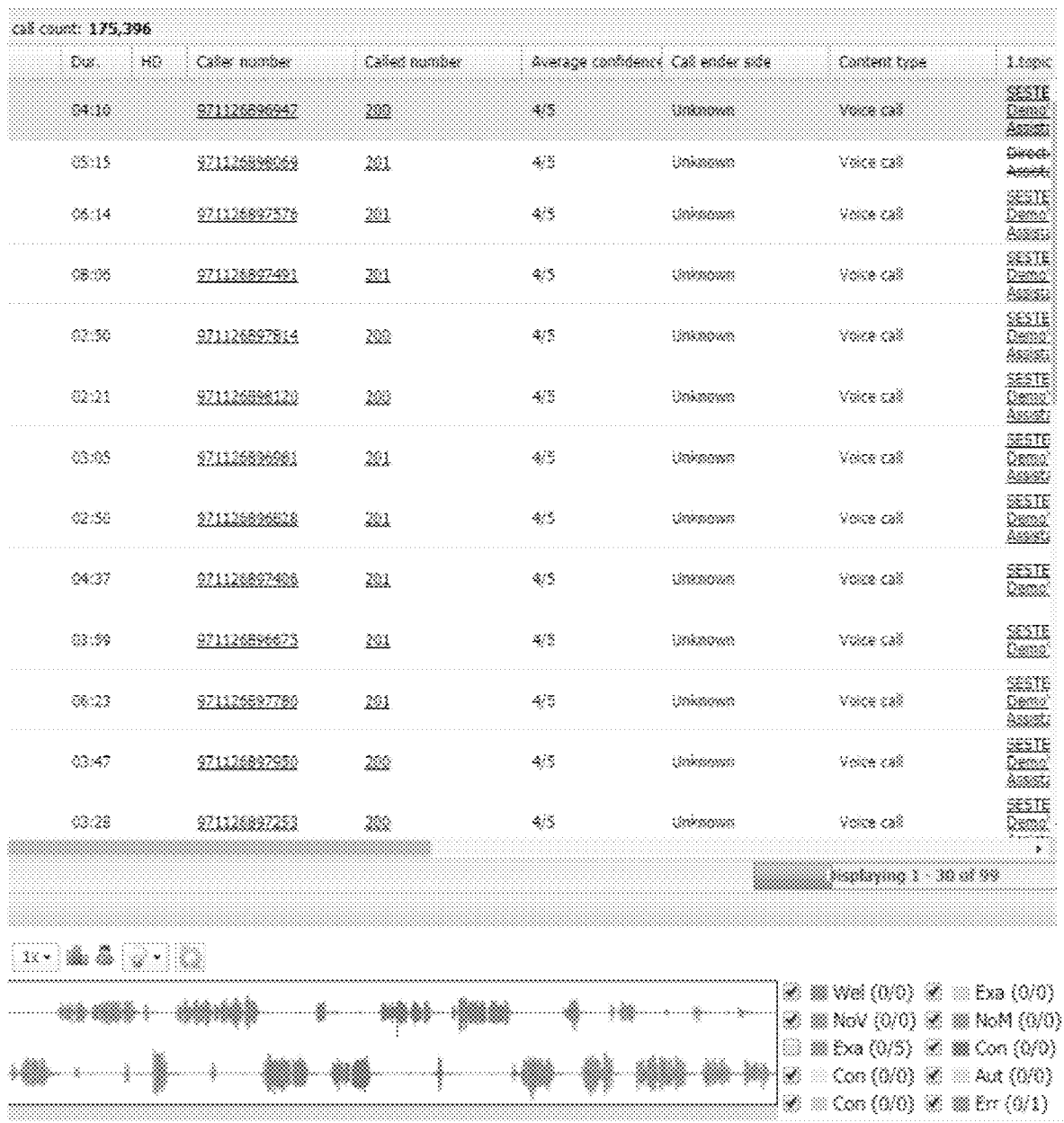

FIGS. 10A-10B shows the result of a quick search. All calls are listed including the information such as the call length, the call time, and the caller phone number. The resulting data can be filtered using desired filters. The corresponding call can be played via a player. One can jump to the section in which the player reads it, by clicking on the tag on the right hand side of the player, and thus, there is no need to listen to the complete call. For example, the Err tag call has been called once, and it will go to the reading section by clicking on it.

Figure 11A:
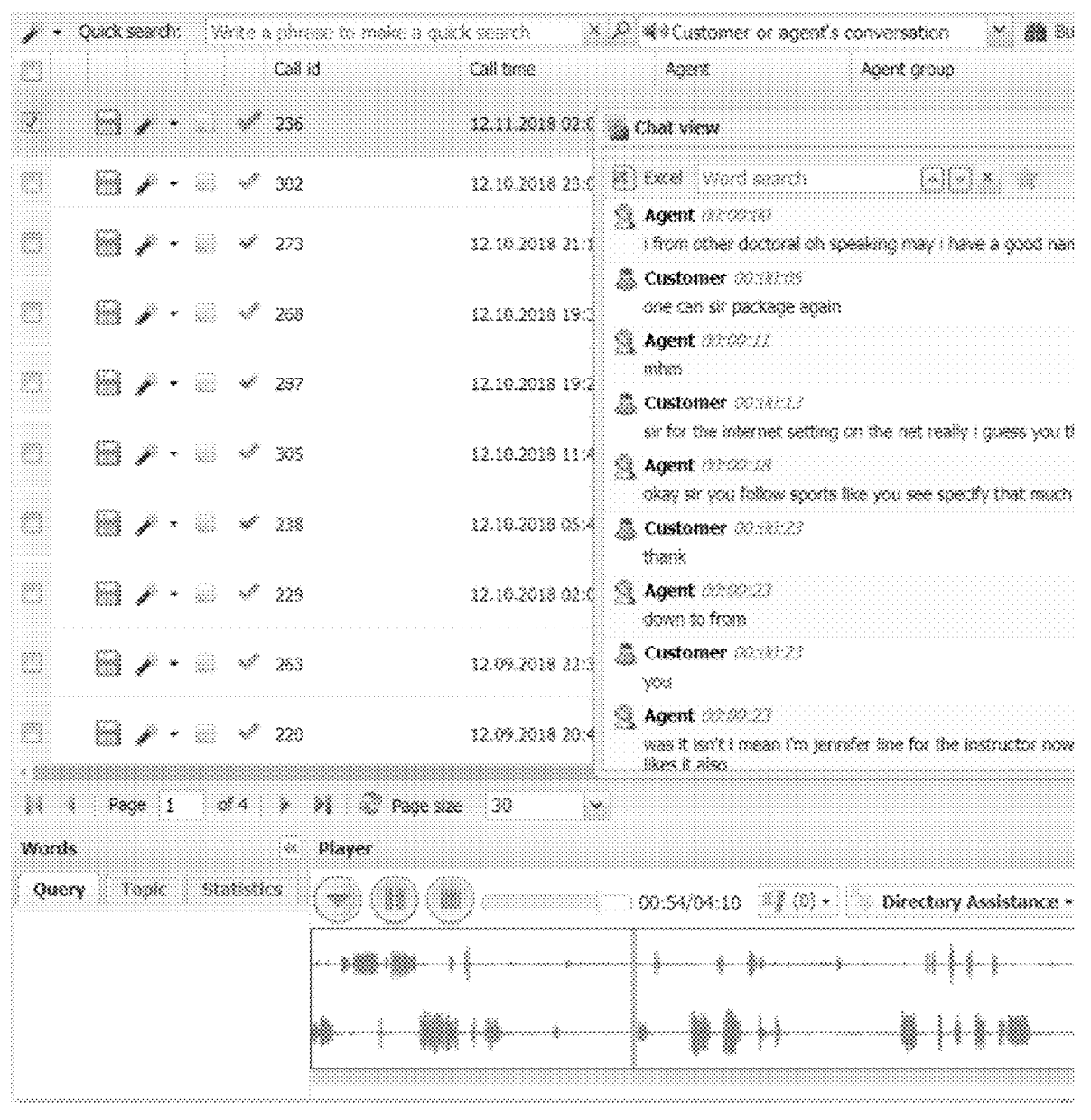
Figure 11B:
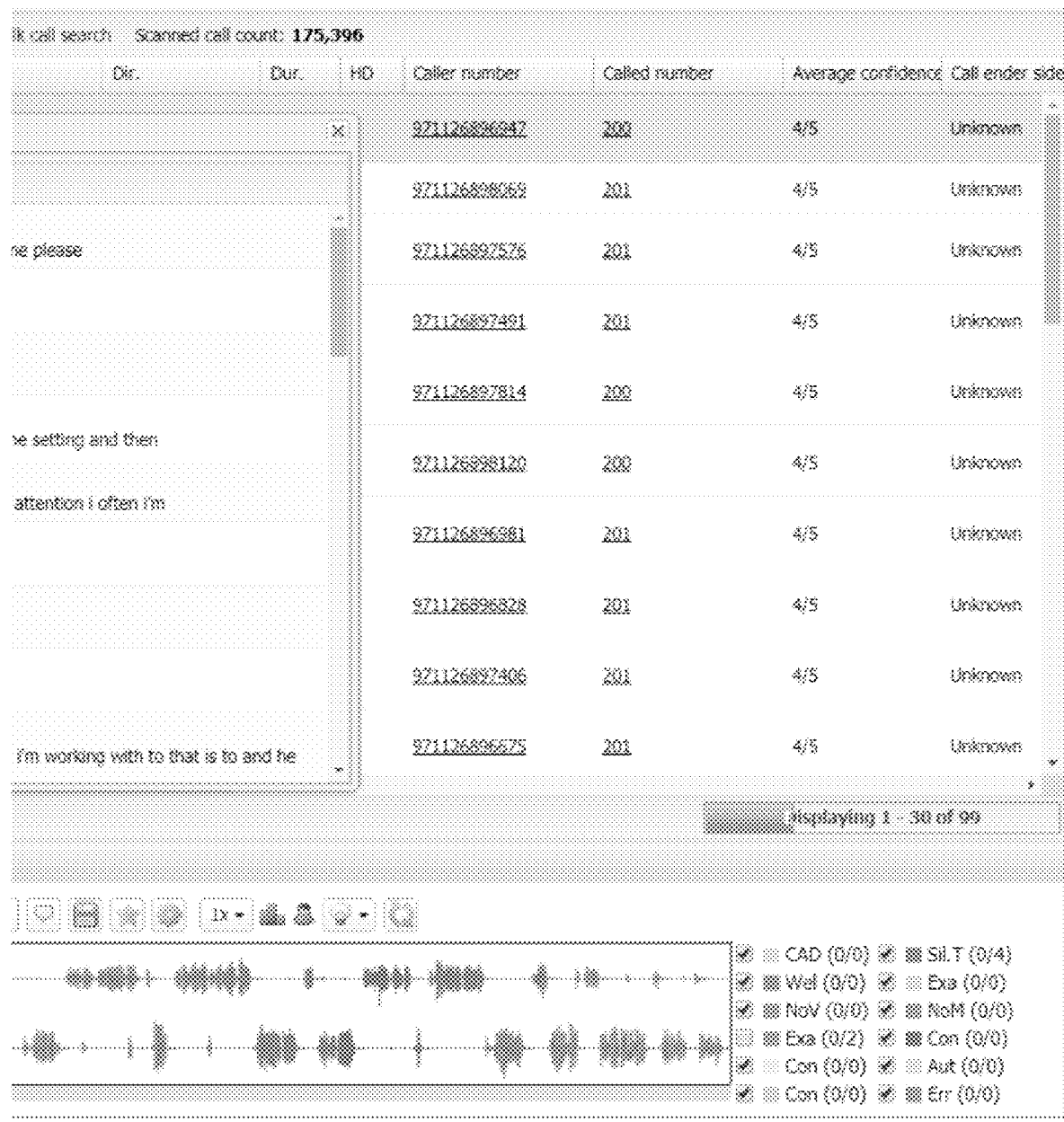

In addition, the conversation is observed on a chat screen and the text is displayed as shown in FIGS. 11A-11B while the call is being played. If there is a word or phrase to be searched, the chat screen where the word was written can be reached. If the interview is only a written conversation, one can only review with the chat screen displayed.

Example 5

Figure 12A:
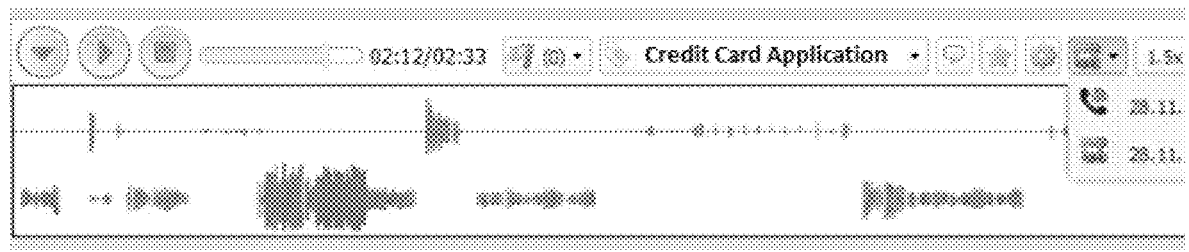
FIGS. 12A-12B is data showing related conversations of a customer with both a live customer representative (or live agent) and an IVR or chatbot.
Figure 12B:
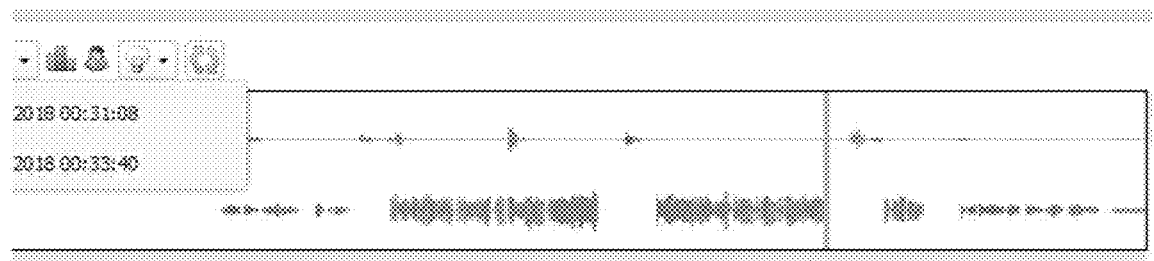

When a customer has a conversation with a live customer agent immediately after communicating with the IVR call device 110 or chatbot, these two interviews will be shown. For example, as shown in FIGS. 12A-12B, the IVR conversation finished at around 00:31, and then a customer started talking to a live customer agent at around 00:33. By clicking on this second record, the call can be accessed and examined. If there is a call in other channels when interviewing with a live customer agent, one can also access those calls in the other channels.

What is claimed is:
1. An analytics system to analyze and report customer experience, comprising:
a customer interface device,
an analysis server which analyzes data from a customer and a machine, and a database which is connected to the customer interface device and to the analysis server wherein the database receives the data from the customer interface device, and/or the analysis server;

wherein the analysis server is configured to measure and analyze a response time of the customer interface device to a customer's speech.

2. The analytics system according to claim 1, wherein the customer interface device comprises an interactive voice response (IVR) call device, a chatbot, or a mobile assistant.

3. The analytics system according to claim 2, wherein the interactive voice response (IVR) call device comprises a unit to receive a call from the customer, a private branch exchange (PBX), a call recording server, and a storage unit for a call record.

4. The analytics system according to claim 1, wherein the analysis server analyzes where the customer wants to transfer to a live customer representative.

5. The analytics system according to claim 1, wherein the analysis server analyzes a stage where the customer ends a process.

6. The analytics system according to claim 1, wherein the analysis server detects an age-range and a gender of the customer.

7. The analytics system according to claim 1, wherein the analysis server calculates a confidence level of a speech recognition.

8. The analytics system according to claim 1, wherein the analysis server uses a speech analytics solution.

9. The analytics system according to claim 1, wherein the data from the customer are protected for security.

10. The analytics system according to claim 1, wherein the analytics system further comprises a natural dialog prompt management device.

11. The analytics system according to claim 1, comprising further a web server through which an authorized user receives call information, speech data, and analysis results.

12. A process to analyze and report customer experience, comprising:
   a) a step of sending speech data in a conversation between a customer and a customer interface device to a call recording server,
   b) a step of measuring and analyzing a response time of the customer interface device to a customer's speech,
   c) a step of recording the speech data in the call recording server and storing the speech data in a storage unit, and sending details of a call from the storage unit and the call recording server to a database, and
   d) a step of sending data from the storage unit and the database to an analysis server, performing speech to text conversion and extracting parameters of the conversation and a speech style of the customer in the analysis server.

13. The process according to claim 12, further comprising step e) wherein the analysis server receives a tag of prompt from the database, and the analysis server tags the prompt with a related tag.

14. The process according to claim 13, further comprising step f) wherein an authorized user accesses a web server, and receives call information, the speech data, and analysis results.

15. A process to analyze and report customer experience, comprising:
   a) recording a written content between a customer and a customer interface device and additional information in a database,
   b) sending data from the database to an analysis server, and extracting parameters about a conversation and a speech style of a customer,
   c) the analysis server measures and analyzes a response time of the customer interface device to a customer's speech and receives a tag of prompt from the database, and the analysis server tags the prompt with a related tag, and
   d) an authorized user accesses a web server, and receives conversation information, and analysis results.

* * * * *